Figure 1:
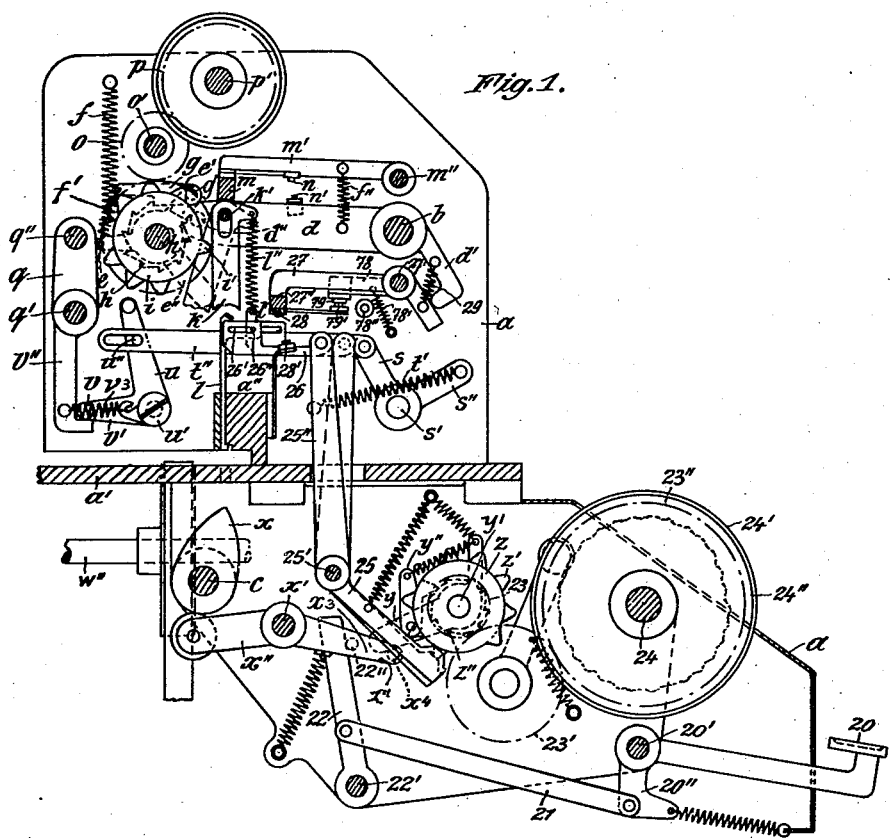

March 31, 1936.   R. SENKEL ET AL   2,035,725
MACHINE FOR READING PERFORATED CARDS
Filed June 29, 1931   10 Sheets-Sheet 1

R. Senkel &
E. Dueball
INVENTORS

By: Marks & Clerk
ATTYS.

March 31, 1936.  R. SENKEL ET AL  2,035,725
MACHINE FOR READING PERFORATED CARDS
Filed June 29, 1931  10 Sheets-Sheet 2
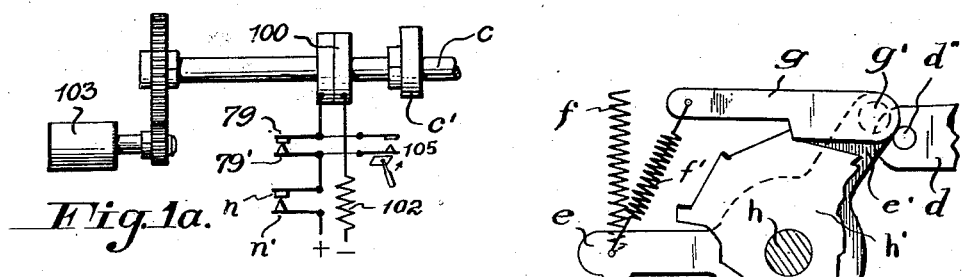
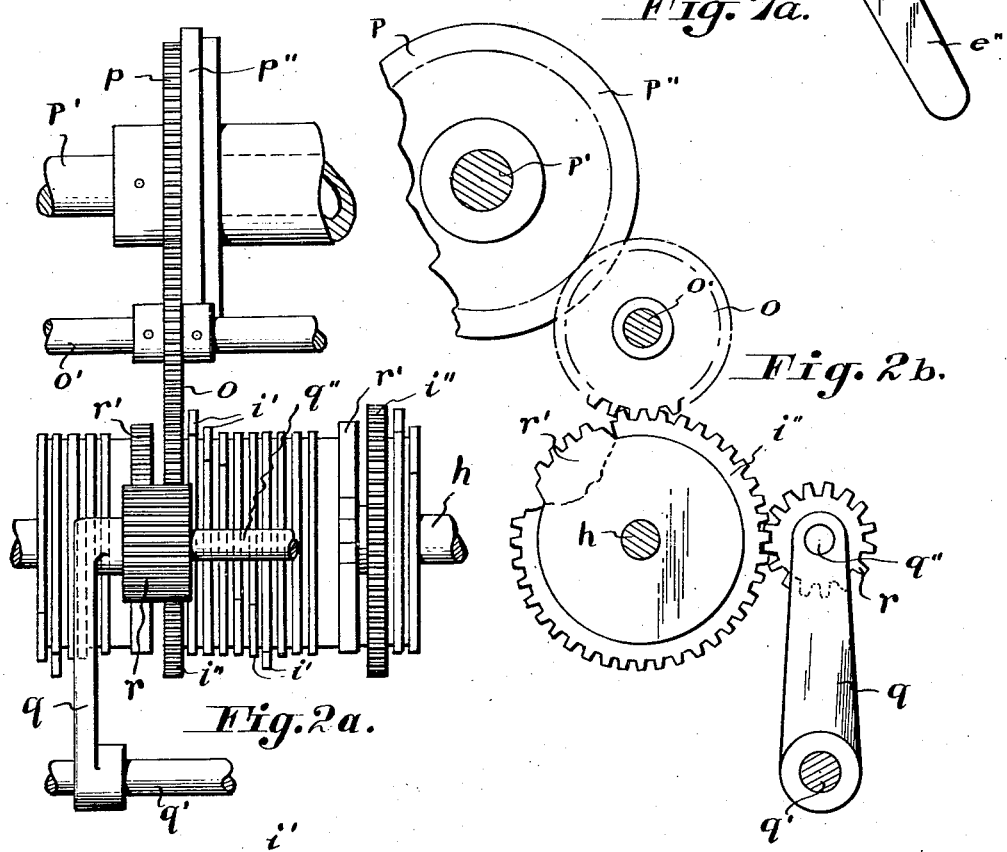
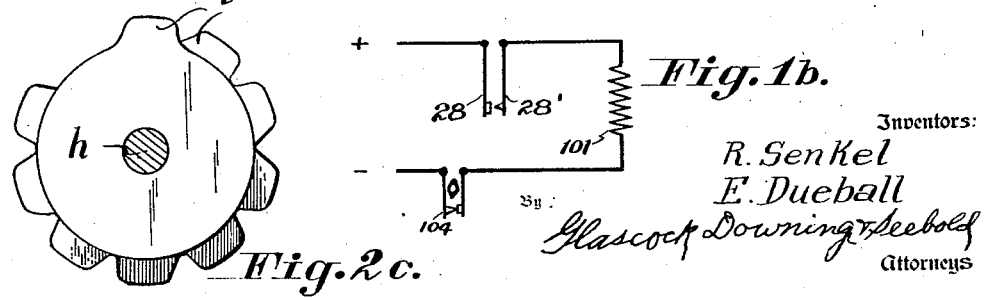

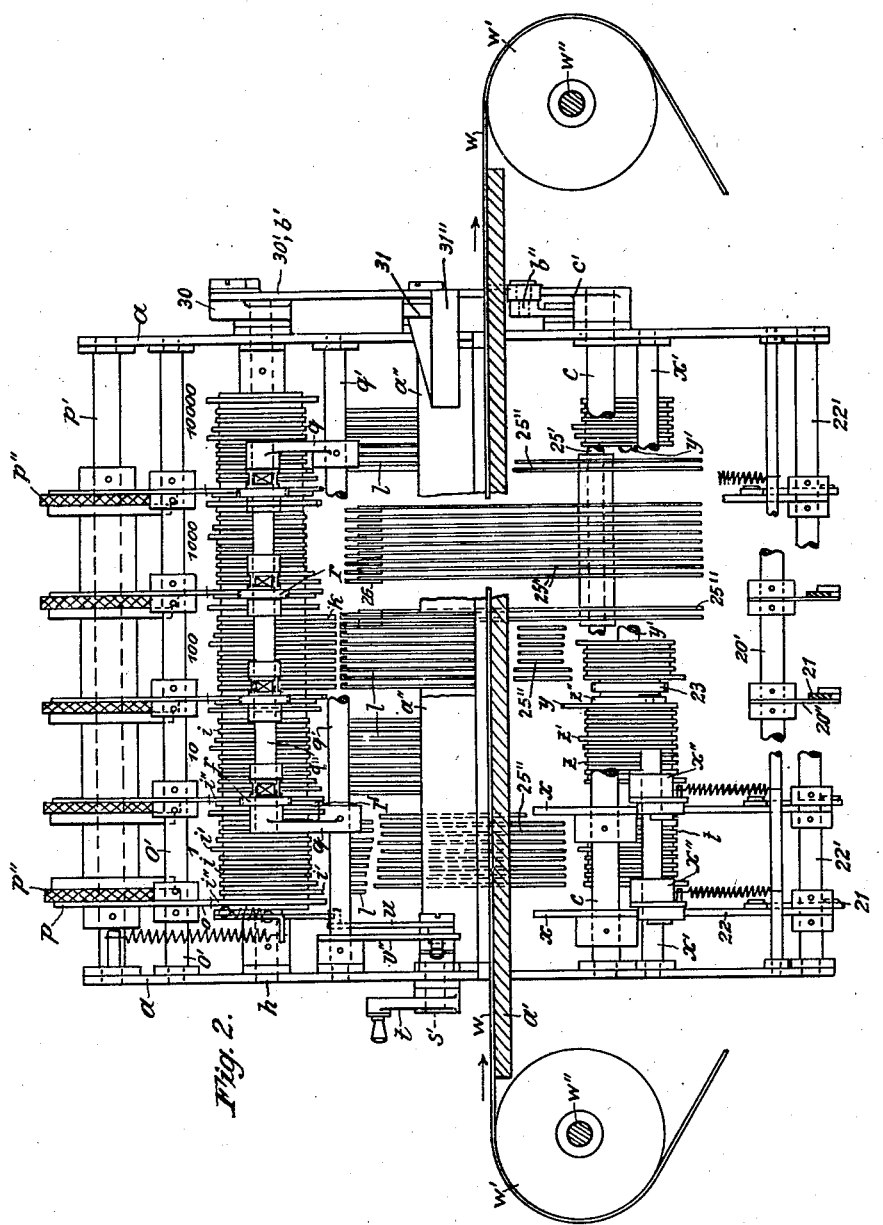

March 31, 1936.    R. SENKEL ET AL    2,035,725
MACHINE FOR READING PERFORATED CARDS
Filed June 29, 1931    10 Sheets-Sheet 4

R. Senkel &
E. Dueball INVENTORS

By: Marks & Clerk ATTYS.

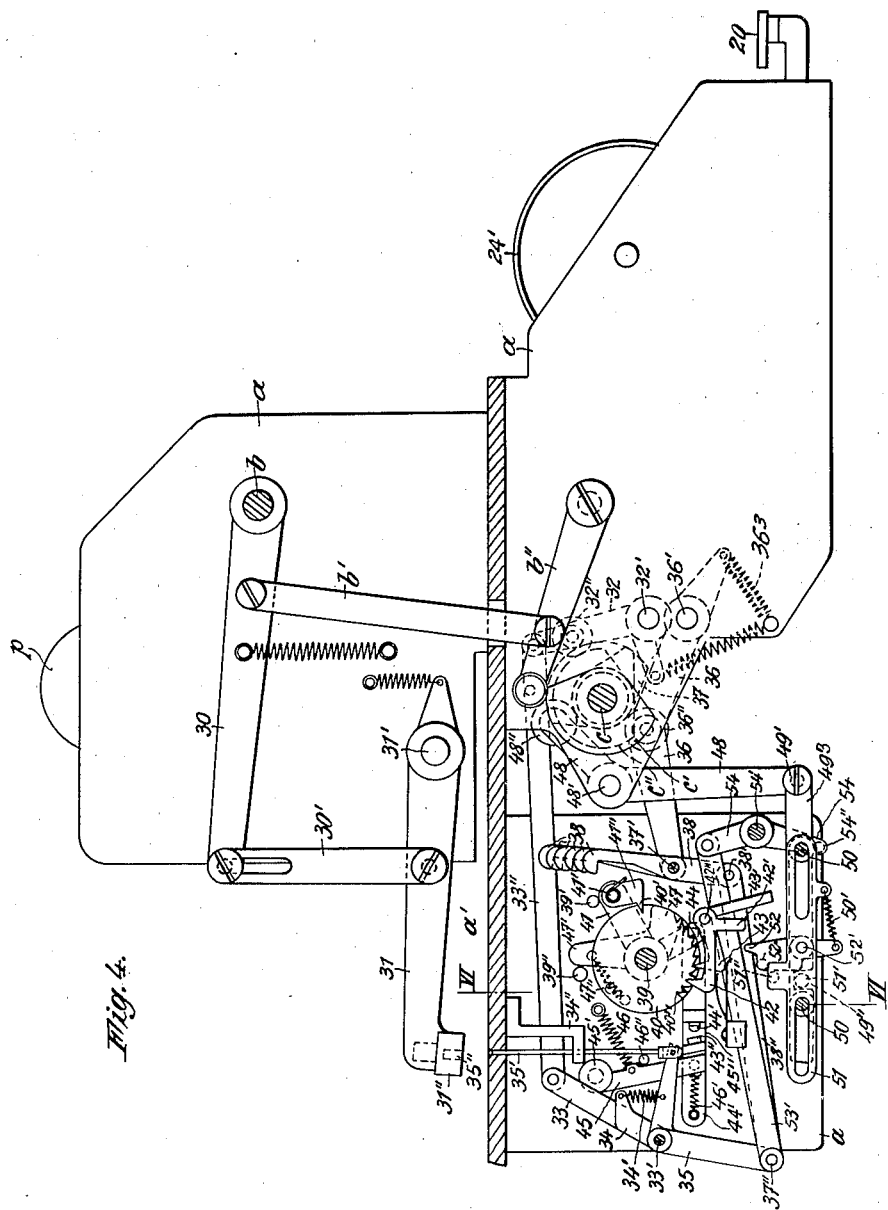

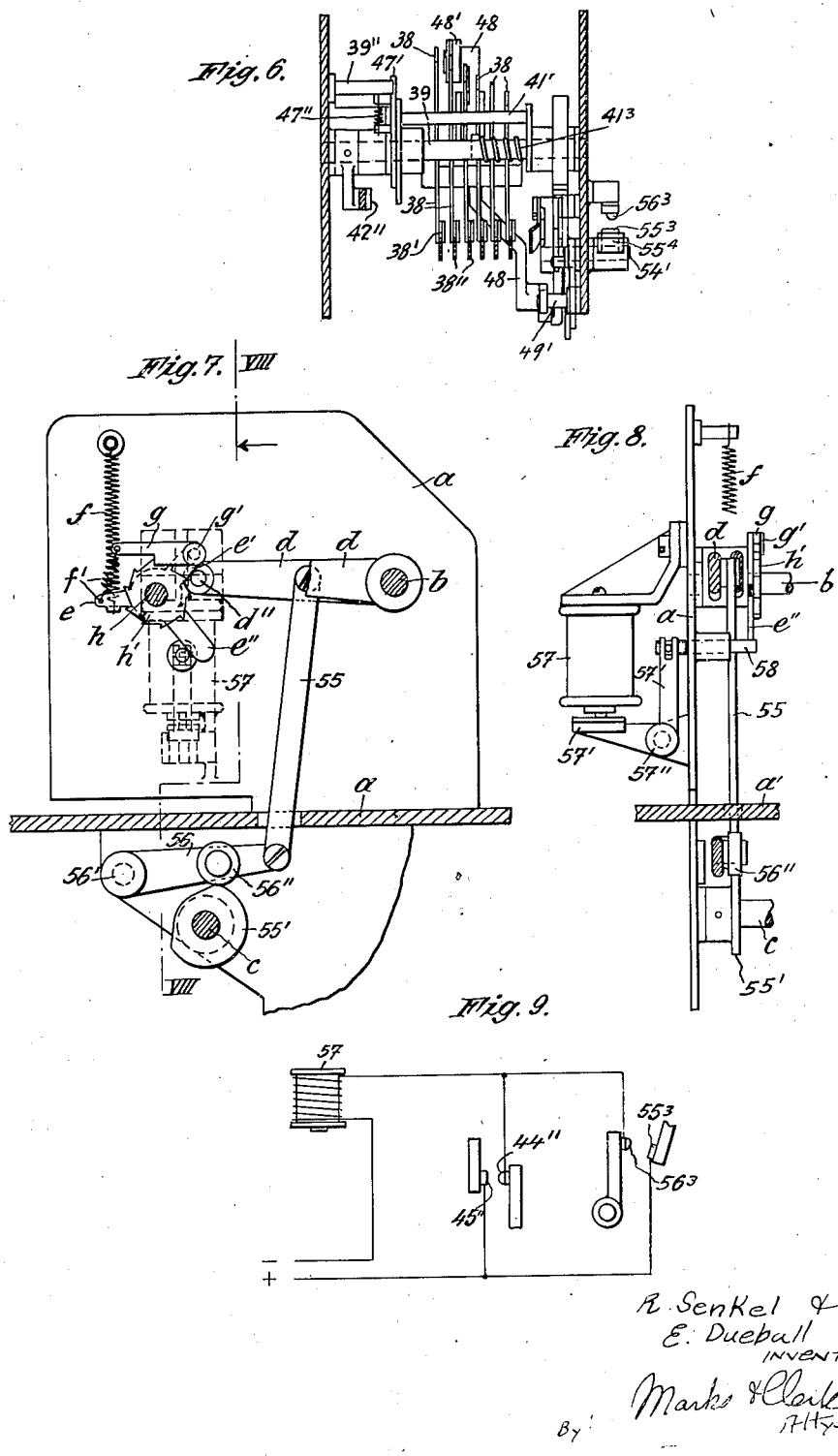

March 31, 1936. R. SENKEL ET AL 2,035,725
MACHINE FOR READING PERFORATED CARDS
Filed June 29, 1931 10 Sheets-Sheet 7
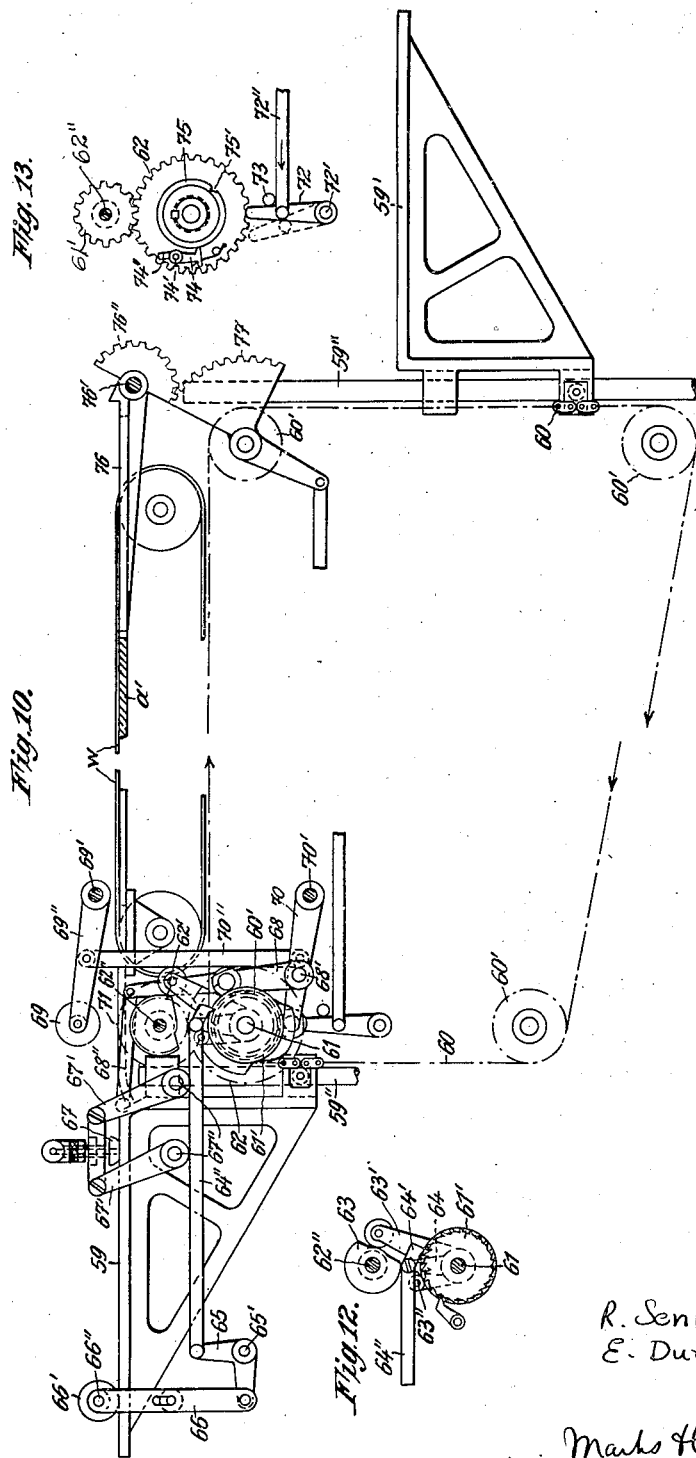
R. Senkel &
E. Dueball
INVENTORS
By Marks & Clerk
ATTYS March 31, 1936.   R. SENKEL ET AL   2,035,725
MACHINE FOR READING PERFORATED CARDS
Filed June 29, 1931   10 Sheets-Sheet 8
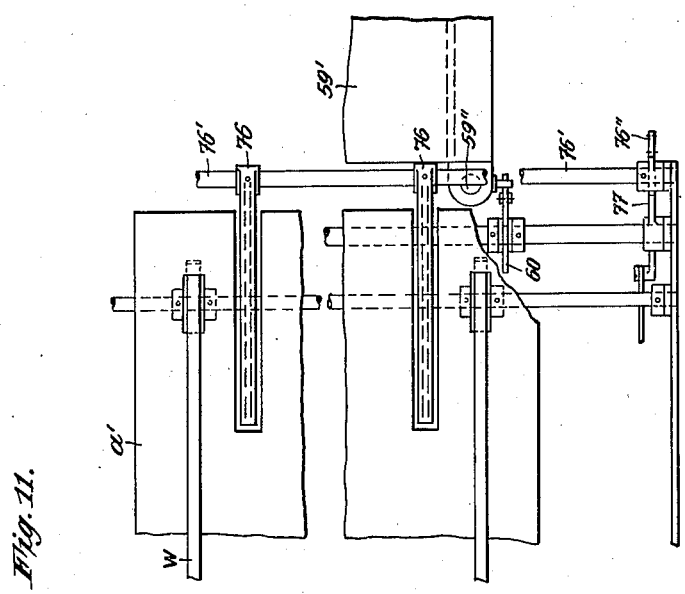
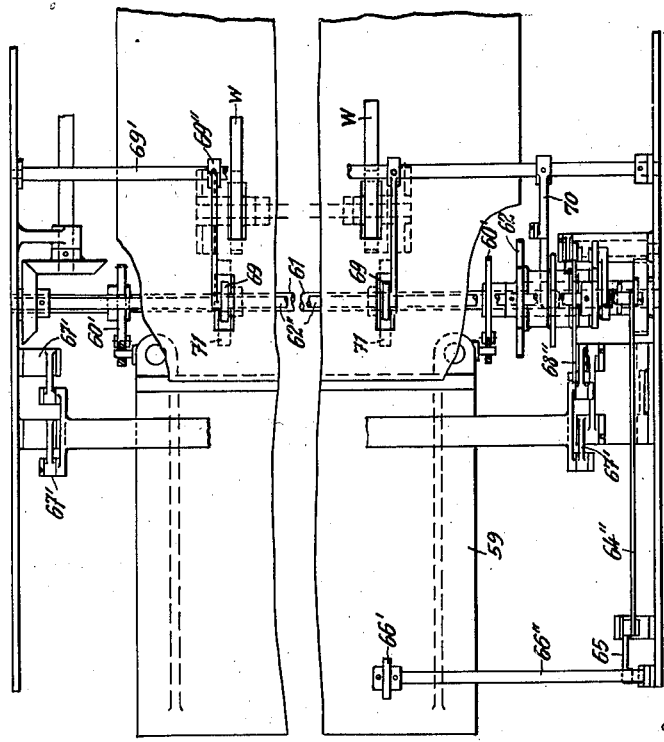
R. Senkel &
E. Dueball
INVENTORS
By Marks & Clark
ATTYS.

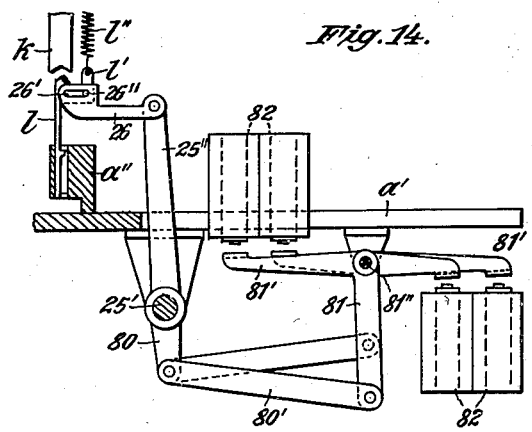
Fig. 14.
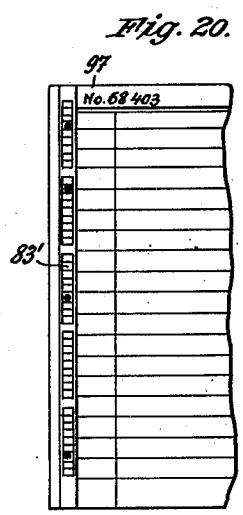
Fig. 20.
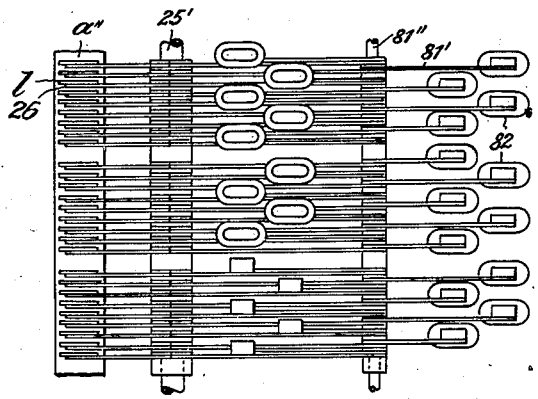
Fig. 15.
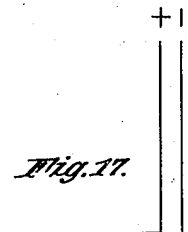
Fig. 17.
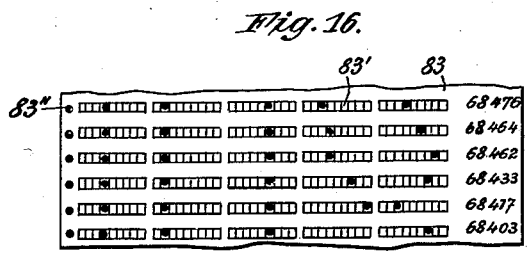
Fig. 16.
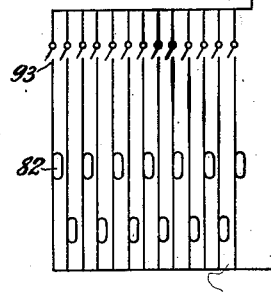

March 31, 1936.   R. SENKEL ET AL   2,035,725
MACHINE FOR READING PERFORATED CARDS
Filed June 29, 1931   10 Sheets-Sheet 10

R. Senkel &
E. Dueball
INVENTORS

By Marks & Clerk
ATTYS

Patented Mar. 31, 1936

2,035,725

UNITED STATES PATENT OFFICE 2,035,725

MACHINE FOR READING PERFORATED CARDS

Richard Senkel and Emil Dueball, Berlin, Germany

Application June 29, 1931, Serial No. 547,766
In Germany July 1, 1930

8 Claims. (Cl. 235—58)

This invention relates to an auxiliary machine for bookkeeping purposes.

For the mechanical transfer of items from a journal sheet or from single cards onto item-accumulating cards there are needed accumulating cards which are fitted with numbers formed by perforations and designating for instance the number of a particular client, or of a particular matter etc. The accumulating cards will then admit of being read by the auxiliary machine in agreement with the account designation of the item to be transferred.

The auxiliary machine forming the object of this invention reads the perforated cards in such a way that the machine selects from a stack a card with a particular account number, and either sorts them out of the stack for example, or else stops them in order that the card may receive the item in a further operation for instance by printing or the like. In order to carry out this selecting of a card from a stack, the machine according to the invention comprises preferably blocks of cam discs the cams of which are displaced relatively from one to another disc to correspond to the numerals from 1 to 9, and are enabled to swing an associated actuating lever into the neighborhood of an associated feeling finger for the purpose of reading the card. By this construction the machine is also enabled to examine a stack of cards for ascertaining whether the stack contains all the cards arranged in right order of numbers, or whether some cards are missing. If a gap occurs, or an incorrectly arranged card follows, then the drive of machine and also the automatic feeding of the cards to the machine are automatically stopped, and an examination with the eye has to be made in order to ascertain what the irregularity is.

Another object of this invention consists in a device which renders possible the aforesaid continuous examination in the case a plurality of cards with the same distinctive number is contained in the stack and, of course, adjacent to another.

Another object of the invention consists in a device which stops an account card which is filled with items. Such cards are provided with a particular perforation symbol for which the machine has a special reading finger, which stops the machine.

For the purpose to pick out a predetermined card during the aforesaid continuous examination of the stack of cards, the machine is equipped with a second set of cam disc blocks similar to the above named cam disc blocks, which act upon the said reading fingers for setting the same in a predetermined position for stopping the machine when the fingers read the predetermined card.

Another object of the invention consists in providing delivery and reception tables for the passage of the stack of cards through the machine which are coupled to one another and to a ratchet mechanism of the said cam disc blocks, so that the two tables move correspondingly to the decrease and increase of the stack from one table to the other.

Figure 5:
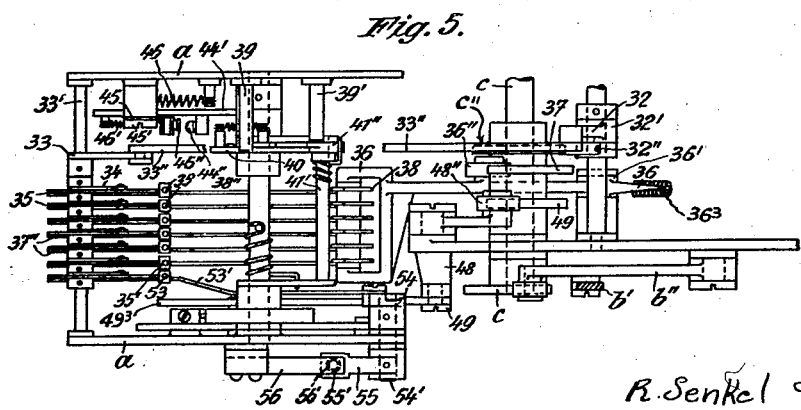
Figure 3:
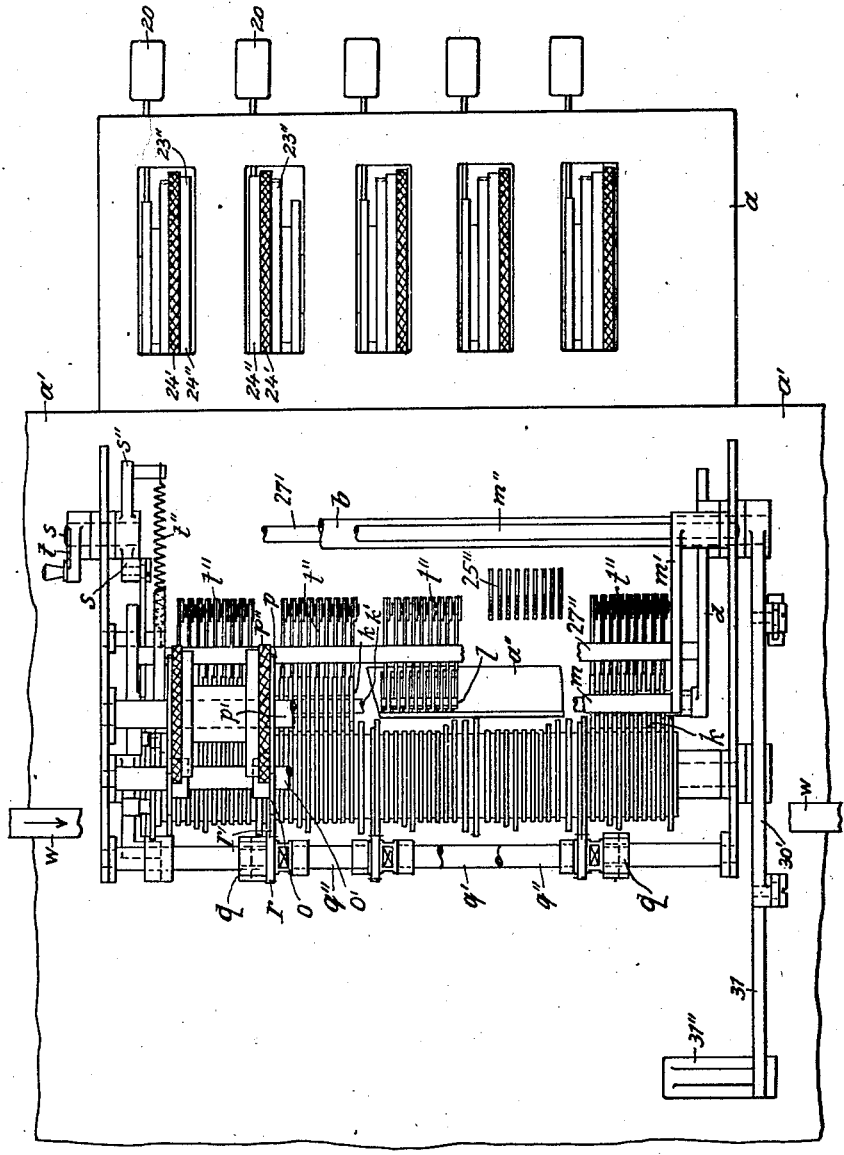
Figure 18:
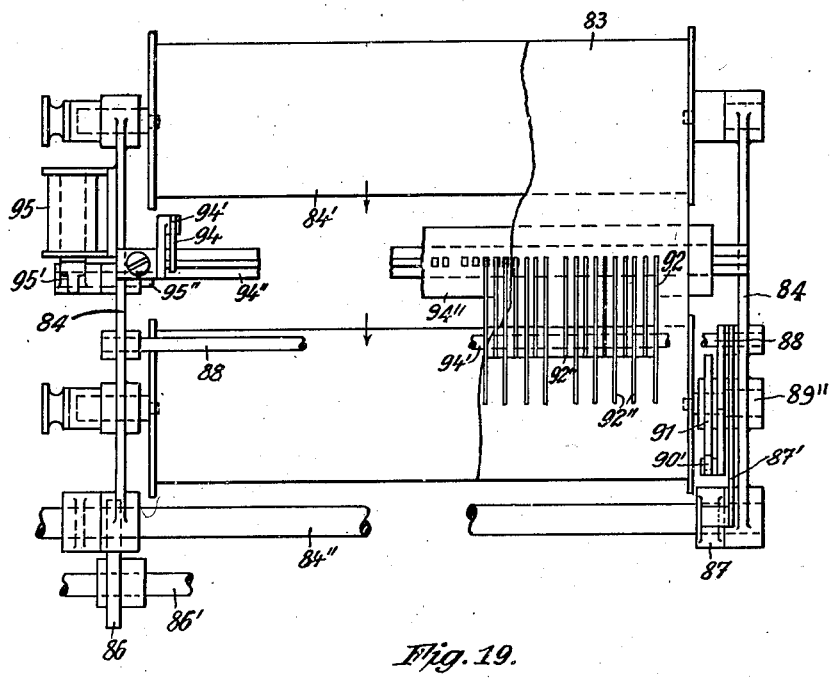
Figure 19:
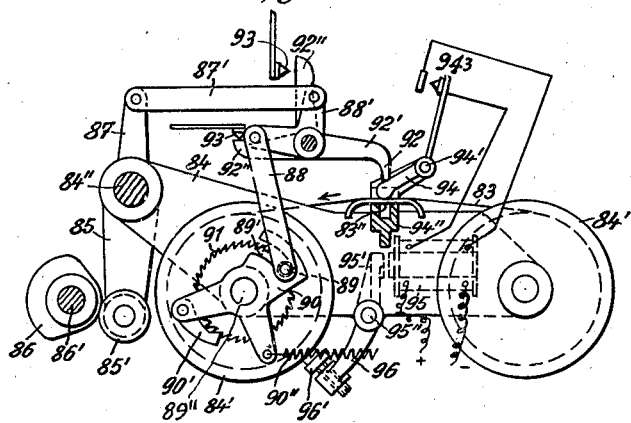

The machine and its individual appliances are illustrated by way of example in the accompanying drawings, in which Figure 1 shows a sectional elevation of the driving mechanism for reading the numbers of the cards, Figures 1a and 1b show electric circuits for association with the shaft c of Fig. 1, Figure 2 is a back view thereof and Figures 2a, 2b, 2c are enlarged details of portions of Fig. 2, Figure 3 is a plan view of the arrangement shown in Fig. 2, Figure 4 shows the driving mechanism for the reading of the sequence cards with the same characterizing number and Figure 5 is a plan thereof, Figure 6 shows a partial section on the line 6—6 in Figure 4, Figure 7 shows the ratchet drive for the cam disc blocks, Figure 7a is an enlarged elevation detail of the three armed lever of Fig. 7, Figure 8 is a section on the line 8—8 in Figure 7, Figure 9 shows a diagram of electrical connections, Figure 10 shows the table with feeding and delivering means, Figure 11 is a plan thereof, Figure 12 shows the drive for the reading of the stack of cards, Figure 13 shows a ratchet drive for imparting single revolutions to a shaft, Figure 14 shows electrically acting means for setting the serial numbers, Figure 15 shows a view from above of this arrangement, Figure 16 shows a perforating example for the perforated strip, Figure 17 shows a scheme for the means in Figure 14, Figure 18 shows means for feeling the perforated strip, Figure 19 shows these means in side elevation, and Figure 20 shows an example of perforating a card.

In the machine frame $a$ is journalled a shaft $b$, upon which a pair of levers $d$ is fixedly mounted. The shaft $b$ is continuously oscillated from a continuously driven shaft $c$ through a cam disc 55' (Fig. 7) which acts upon the roller 56'' of a lever 56 journalled at 56' and thereby acts on a rocking arm 55 which transmits an oscillating movement to the said levers $d$. Furthermore, in the frame $a$ is journalled a shaft $h$. Upon the latter is mounted a ratchet wheel $h'$ (Figs. 1, 7 and 7a) with which there meshes a pawl $g$, which is pivoted at $g'$ to a lever arm $e'$ which oscillates loosely about the shaft $h$. The arm $e'$ is a part of a lever with three arms $e$, $e'$, $e''$. The arm $e'$ is pressed by a spring $f$ which acts on the arm $e$ against a pin $d''$ on the lever $d$. The pawl $g$ is subjected to the action of a spring $f'$ which also bears against the arm $e$. When the arm $d$ swings downward the arm $e'$, with the pawl $g$, falls under the action of the spring $f$, and the pawl $g$ drops behind the next tooth of the ratchet wheel $h'$. During the upward swing of the arm $d$ it presses the arm $e'$ back with its pin $d''$ and feeds the ratchet wheel $h'$ one tooth further by means of the pawl $g$. This ratchet wheel has ten teeth, so that the feed amounts to one tenth of a revolution each time.

Upon the shaft $h$ moreover are also mounted for instance five blocks of cam-discs $i$ (Fig. 2 and 3), each comprising nine cam discs $i'$. Each block of cam-discs corresponds to a digit of a number with five digits, which in form of perforations 83' (see Fig. 20) is placed on the cards. There are arranged on the left margin of the card five rows each of nine perforation places, these places denominating the numbers 1 to 9. By dark points in these rows is designated for instance the card number 42607, the digit zero being designated by no-perforation in a row. The cam-discs of the first block from the left in Fig. 2 correspond to the units of the card-numbers, the cam-discs of the following block to the tens of the card-numbers, the cam-discs of the third block to the hundreds of the card-numbers and so on. Each cam-disc has only one cam $i'$, the cams of the nine discs of a block $i$ being displaced relatively from one tenth of the periphery to the next (see Fig. 2c) and so forming a helical cam-line upon the surface of the said block. The block is adapted to be shifted one revolution by ten steps, thereby bringing nine cams in working position, the tenth position being not cam-fitted. Upon the said first block $i$ there is fixedly mounted a ratchet wheel $r'$ at the right end of the block, whereas upon the left end of the next block there is fixedly mounted a ratchet wheel $i''$ of like diameter of the pitch circle with the ratchet wheel $r'$ (see also Figs. 2a, 2b). A toothed wheel $r$, which is loosely mounted upon the shaft $q''$, meshes with both wheels $r'$, $i''$. The shaft 9'' is held between two arms $q$ extending from the shaft $q'$, which is arranged between the plates $a$ of the frame. Each wheel $r'$ having for instance four teeth on a tenth of its periphery, the remaining part of the later having no teeth and each wheel $i''$ having 40 teeth, disposed on its periphery, each complete revolution of a block $i$ will feed the next block by the action of the wheel $r$ forward one tenth of a complete revolution. Therefore after each ten steps of one block the next block is shifted one step forward in a similar manner as in the well known tens-carrying mechanism of a computing machine.

With the toothed wheels $i''$ there mesh toothed wheels $o$ which are loose upon a shaft $o'$. With the toothed wheels $o$ there mesh toothed wheels $p$ which are mounted loose upon a shaft $p'$, but are each rigidly connected with a hand wheel $p''$. Adjacent to the hand wheels $p''$, numeral discs are mounted on them, which exhibit a fresh number 1 to 9 and 0 at every tenth of a revolution of the appertaining cam disc blocks.

On the frame there is supported at $s'$ a lever $s''$ (Fig. 1) which is subjected to the action of a spring $t'$ and has a second arm $s$, to which a link $t''$ is pivoted, which engages with an elongated hole round a pin $u''$ on a bell crank lever $u$ pivoted at $u'$, one arm $v'$ of the said lever being located with a pin $v$ in front of an arm $v''$, which is rigidly connected with the shaft $q'$. Upon the pivot $s'$ rigidly connected with the arm $s''$ is mounted outside the casing a hand lever $t$. In the position shown, the toothed wheels mounted upon the rod $q''$ are held in mesh with the toothed wheels $i''$ of the cam disc blocks. When the hand lever $t$ is swung downwards in clockwise direction (Fig. 1), the spring $t'$ is carried past its dead center and therefore also holds the lever arms $s$ and $s''$ firmly in this position. By this swinging movement of the hand lever $t$ the bell crank lever $u$ is swung to the right hand in Fig. 1 by the link $t''$, and the pin $v$ lets the arm $v''$ follow it under the action of a spring $v^3$. The rods $q'$ and $q''$ with the toothed wheels $r$ therefore swings back from the cam disc blocks $i$, and the wheels $r$ come out of engagement with with the toothed wheels $i''$ of the cam disc blocks $i$. Consequently the cam disc blocks can be adjusted at will individually to any desired number by means of the hand wheels $p''$.

The arms $d$ (Fig. 1) are connected by a rod $k''$. Upon this rod are guided each by an elongated hole, actuating fingers $k$, each of which is located within the range of the cam $i'$ of an associated cam disc $i$, so that each actuating finger can only be swung out of the inclined position shown in Figure 1 into the vertical position against the action of the spring $l''$ by its own cam disc. Since only one cam $i'$ of each block of cam discs can press one of the associated nine actuating fingers at once five actuating fingers of the five blocks shown corresponding to a definite number having five digits, are pushed into the vertical position. To each actuating finger $k$ a reading finger $l$ belongs. All the reading fingers $l$ are vertically guided in a block $a''$ on the frame $a$. Upon these reading fingers $l$, however, only those associated actuating fingers $k$ can act during their downward movement which are swung into the vertical position, that is, above the reading fingers $l$, while the others move idly up and down at the side. Above the actuating fingers $k$ is arranged a strip or bar $m$, which is mounted fast on two arms $m'$ fixed at a shaft $m''$. (Figs. 1 and 3 show only one of said arms $m'$). The arm $m'$ is pulled against the arm $d$ by a spring $f''$. On the arm $m'$ is mounted a contact $n$ and on the frame $a$ a co-acting contact $n'$, both of which lead through a source of current to an electromagnetical coupling device 100 (Fig. 1a) for the main shaft of the machine, which is driven by a motor 103.

The reading fingers $l$ serve for feeling the cards continuously supplied on to the table $a'$, which are perforated numerically at a particular position. The reading fingers $l$ can pass freely through the holes in the card, when the arm $d$, with the actuating fingers $k$ adjusted to correspond to the number of the card, swings downwards and depresses the reading fingers against the tension of springs $l''$ which engage a slider 26 pivoted on arm 25'', (hereafter described). If all the reading fingers $l$ have found their holes, the bar or strip $m$ can also freely follow, and the contacts $n$ and $n'$ close. A current impulse is thereby produced, which closes at one revolution coupling 100 (Fig. 1a) and simultaneously excites an electromagnet 102, which causes a forward feeding movement of the run of cards as is to be described later on. (A one revolution coupling is shown in Fig. 13 and described later on). If however a card with a wrong number occurs, then at least one of the reading fingers $l$ remains behind, not findings in the card its corresponding hole. Consequently also its actuating finger $k$ is held back. In this case the elongated hole in the actuating finger $k$ comes into operation. The bar $m$ remains stationary upon the corresponding finger $k$, which is held back, and the contact impulse by $n$, $n'$ is omitted. The run of the cards is therefore discontinued and the wrong card must be taken away.

The supplying of the cards is effected in a known manner by means of running bands $w$, which pass over rollers $w'$ (Fig. 2) mounted upon the shaft $w''$ and over the table $a'$. The driving is effected by suitable ratchet gear, shown in Figure 13, which will be further described below.

Upon the shaft $c$ is also mounted a cam disc $x$, (Figs. 1 and 2) which acts upon an arm $x''$ supported at $x'$, and sets it in oscillation. Its co-acting arm $x^3$ acts with a pin $x^4$ upon an arm $y$, which is rotatable about a shaft $y'$, and is pivoted to a pawl $y''$, which engages with a ratchet wheel $z''$, which is likewise loose upon the shaft $y'$. This ratchet wheel $z''$ is connected with a block of cam discs $z$ (Fig. 2) similar to the first-mentioned block of cam discs $i$, in the same manner as the ratchet wheel $h'$ (Fig. 7) is connected with the cam disc block $i$. There are five cam disc blocks $z$ provided corresponding to the five cam disc blocks $i$. Each cam disc block $z$ has however a similar ratchet wheel $z''$. The driving of the cam disc blocks $z$ by means of their ratchet wheels $z''$ from the cam disc $x$ can however only be effected when one of five keys 20 (Figs. 1 and 3) is depressed, these keys being supported at 20' in the frame $a$ and a link 21 being pivoted to the arm 20'' thereof, which link is connected with the arm 22 supported at 22'. On each arm $x^3$ is mounted a pin 22''. As the arm $x''$ is continuously swung to and fro by the cam disc $x$, the arm 22, when the key 20 is released, is pulled forward by the spring acting upon the key arm 20'', so that in the upper position of the arm $x^3$ the arm 22 places itself under the pin 22'', and holds the lever $x^3$, $x''$ in the upper position. The arm $x''$ of this lever is therefore drawn out of reach of the appertaining cam disc $x$ and stopped. The rotation of the appertaining block of cam discs $z$ is therefore also interrupted.

Each block of cam discs $z$ carries a toothed wheel 23, which meshes with a toothed wheel 23', which in its turn meshes with a toothed wheel 23'' on a shaft 24. With the toothed wheel 23'' are rigidly connected wheels 24', which carry numeral discs 24'' for reading and adjustment. A tilting catch of the usual type ensures the arcuate positioning of the numeral discs. Within reach of each block of cam discs $z$ there engages a double lever 25 (Fig. 1) supported at 25', to the arm 25'' to which is pivoted a slider 26, which, with an elongated hole 26', engages round a pin 26'' on a lateral projection of the associated reading finger $l$. On the frame is also mounted a pair of arms 27 (Fig. 1) connected with a bar or strip 27''. On the latter is mounted a contact 28 and on the frame $a''$ a co-acting contact 28'. The arm 27 is pulled by a spring 29 against the arm $d'$ of the rocking arm $d$, and therefore follows its movements.

The device so far described is enabled to stop a particular one of the cards which are continuously supplied on to the table $a'$ and thus to keep a selection from a stack of cards. For this purpose the number of the card to be selected is adjusted by means of the hand wheels 24' for instance, on the blocks of cam discs $z$, the cams $z'$ of which, and of course only a single one from each individual block, corresponding to the units, tens, hundreds, and so forth of the particular number, pushes away the associated arm 25. The co-acting arm 25'' is thereby rocked to the right, and pulls its slider 26 with it. The latter therefore takes up a position underneath the bar 27''. The sliders in question remain stationary in the right hand position, and prevent the contacts 28 and 28' from closing so long as the bar 27'' cannot follow. If, however, the card with the adjusted number is supplied, then all the fingers $l$ can follow and pull their sliders down with them. The bar 27'' is accordingly able to follow, gives contact between 28 and 28', and the current impulse produced excites an electromagnet 101 (Fig. 1b) which effects the explosion of this card by means of a suitably arranged ejector for printing this card with a booking item or the like by a printing device (not shown) associated with the machine here described. Simultaneously a contact 79, 79' partly mounted upon the bar 27'' is opened and switches off the circuit of the one-revolution coupling device 100 (Fig. 1a). The machine is then stopped.

The adjusting of the numbers for the cards to be picked out may be effected by means of the keys 20 instead of the hand wheels 24', owing to the fact that when the keys 20 are depressed, the blocks of cam discs $z$ are fed forward from the cam discs $x$ through the levers $x^3$ in continuous numbers until the desired number appears. Then the keys are set free, and the drive of the cam disc blocks $z$ is switched off as described above.

An arm 30 (Fig. 4) mounted loosely upon the shaft $b$ and set in oscillation by the main shaft $c$ by means of the cam disc $c'$ (Fig. 4) and the levers $b''$, $b'$ transmits its movement through a link 30' to an arm 31, which is supported at 31' and which swings with a clamping jaw 31'' over the table $a'$, and holds fast the cards supplied in their definite stop position for reading.

Should it not be desired to arrest a particular card but only to ascertain whether the cards in the pile are in proper sequence, then the switches 104, 105 (Figs. 1a, 1b) which are thought as being coupled together, are thrown over, whereby the contacts 79, 79' are bridged and the circuit of the contacts 28, 28' is broken. It is now immaterial whether or not a slider 26 is moved under the bar 27'', that is to say the machine has been set from the block $z$ to a definite card, since the bar 27'', even when it follows the swinging movement of the rocking arm *d* in the downward direction, can neither put the coupling 100 out of action by opening the contacts 79, 79' nor can it put it in the electromagnet 101 by closing the contacts 28, 28'. The operation of reading the cards is now as follows. If for instance the cam disc blocks *i* at any particular moment are in such a position that they represent the number 68476, then the feelers *l* search for this number on the cards and when a card arrives bearing this number, all the feelers meet perforations. The bar then sinks and closes the contacts *n*, *n'*. By this means the one revolution coupling 100 is put into operation anew and the rocking arm *d* executes another swinging movement. This rocking arm, however, during its previous return movement in the upward direction has moved on the cam disc block *i* by an amount corresponding to a single step so that now the number 68477 is set up on the blocks *i* and the feelers *l* which have been suitably set afresh, during the new swinging movement of the rocking arm *d*, search for this number on the cards and so on. If now, for instance, this card is missing in the pile, then the feelers do not find the number 68477 and the bar *m* remains in the upper position so that the contacts *n*, *n'* are not closed and the coupling 100 is not placed into operation. The machine therefore remains stationary and it is necessary to correct the numerical sequence of the cards in the pile by hand in order to enable the machine to continue in operation. The missing card is by this means discovered and the pile of cards corrected.

While the reading by continuous numbers in the manner described is being effected by the reading fingers *l*, a reading of successive cards with the same number is effected by reading fingers 35' (Figs. 4 and 5) which read from below being guided in holes of the table top *a'* and in bearings 34", and each finger 35' being moved by a bell-crank lever 35 supported at 33'. Six fingers 35', for example are supported side by side, which serve for compiling in reading one to six "sequence cards", that is cards which have the same distinguishing number but because of differing in account character, the latter being usually distinguished as current, personal, real, agents' account and so on, have uniformly one of six different hole positions by being read by the one or other of the said fingers 35'. A seventh reading finger 53 is arranged parallel with the fingers 35' and serves for reading a "full"-hole, that is, a card which, when it is filled up, receives at a particular position a hole located to correspond to this reading finger 53. While the bell-crank levers 35 are mounted loosely upon the shaft 33', the seven arms 34 are mounted fast upon them, and also one arm 33, which is set in oscillation by the link 33" and the arm 32 supported at 32', by the cam disc *c"*, which is mounted upon the shaft *c* and which acts upon the roller 32" of the arm 32. Each arm 34 is connected with its bell-crank lever 35 by a spring 34', which is stressed when the arms 34 swing to the left, so that the reading fingers 35' can follow, if the card presented has corresponding holes. The fingers that find no hole are held back with their bell-crank lever 35, so that only the spring 34' is stressed. The clamping jaw 31" has corresponding guiding holes 35" for the ascending fingers 35'.

Each of the bell crank levers 35 with the exception of the last for the finger 53, is connected by a link 38". through the pivot 38', with a double lever 38. These six double levers 38 are rotatable about a shaft 37' on a lever 36 supported at 36'. The latter is pressed by a spring $36^3$ with its roller 36" against the cam disc 37 on the shaft *c*, and is therefore set in oscillation during the revolution of the latter, taking the hook levers 38 up and down with it. The latter oscillate idly as long as the reading fingers 35' occupy their lower position. When however they find corresponding holes in a card presented, their bell-crank levers 35 follow the pull of the spring 34' and swing the associated hooked levers 38 over a bolt 41' on an arm 41, which swings loosely about a shaft 39, and carries a pawl 41".

The latter is spring-pressed upon the periphery of a disc 40 mounted fast upon the shaft 39, and normally rests in a gap 40' thereof. The hooked levers 38 are of different lengths stepwise, and the longest hook corresponds to only one sequence card being associated with each master card, the shortest lever 38 corresponding to six sequence cards being associated with each master card. According to where one of the fingers 35' finds a perforation in the master card, the one or other lever 38 is swung over the bolt 41' when this finger 35' finds this hole, that is, in the case of one sequence card hole, only the longest hooked lever 38, in the case of two sequence card holes the next longest, and so on. One hole differentially arranged is sufficient in all cases. In consequence of the pendulum-like swinging of the hooked levers 38 by their carrying arm 36 they take with them the arm 41, with the pawl 41", and swing the disc 40 through the corresponding angle in a clockwise direction. The reached position of the disc 40 is held fast by the pawls 42 and 43, which drop into the toothed segment 40". of the disc 40 and are rotatably supported at 42". The pawl 41" returns with the returning lever 38 by aid of a spiral spring $41^3$ (Fig. 6) wound upon the axle 39.

Upon the shaft 39 is mounted fast the arm 44, to which the contact bar 44' is pivoted, which carries a contact 44". Before it is located the co-acting contact 45" on the arm 45 supported at 45', which is connected by the spring 46' with the sliding contact bar 44', and by a spring 46, which is stronger than the spring 46', is pulled on to the stop 46". As soon as the arm 44 swings in a clockwise direction, its contact 44" meets the co-acting contact 45", and a current impulse is caused, which, in its turn excites an electromagnet 57 (Fig. 9) for locking the advance of the cam disc blocks *i*, so that the particular number adjusted by them remains stationary until the contact is released again. Hence the number adjusted by the cam disc blocks *i* remains stationary as long as cards with the same distinguishing number are placed before it. In the meantime the magnet 57 (Figs. 7 and 8) holds its armature 57' attracted, which forms a bell-crank lever supported at 57", and engages with the bolt 58 guided in the frame *a*. This is located within reach of the arm *e"* connected with arm *e*, and is pushed by the magnet 57 within reach of the arm *e"*. Consequently the arm *e'*, with its pawl *g*, during the swinging movements of the pair of arms *d*, under the action of the spring *f*, cannot follow to take behind another ratchet tooth, and the advancement of the cam disc blocks is suspended as long as the contacts 44", 45" are closed, that is to say, as long as sequence cards are submitted.

The contacts 44" and 45" remain closed until the last sequence card is dealt with. If one of these fails, the fingers l meet the next master card carrying another number and stop therefore the machine as is described above. The number of sequence cards plays no part, for with six sequence cards for example the slider 44' is pushed farthest to the left, the contact lever 45 being carried therewith and holding closed the contacts 44", 45". In reverse movement of the slider 44' the arm 45 follows holding the said contacts closed until the arm 45 strikes against its abutment 46". After this the contacts are separated when the slider 44' executes the last step in normal position to the right.

The reverse movement of the slider 44' is executed by disengagement of the pawls 42 and 43 in stages according as the sequence cards are dealth with, the shaft c acting by means of the cam 49 upon the roller 48" of the bell-crank lever 48, which swings about 48' and to which at 49' there is pivoted a slider 49³, which engages with a recess 49" over the pin 51' of a second slider 51 guided upon the bolt 50 fastened in the frame. On the slider 51 a disengaging pawl 52 is oscillatable at 52'. The disengaging pawl 52 acts upon the arm 42' of the pawl 42 and also has a pin 52" within reach of the arm 43' of the second pawl 43. The two pawls 42 and 43 are staggered to the extent of half a tooth, and disengage in succession, so that at least one of them holds back the disc 40. During the movement of the disengaging pawl 52 towards the right, it lets the arm 42' slip past after the deflection of the pawl 42, until the pin 52" strikes against the arm 43' and releases the other pawl, in which case the pawl 42 drops into the next tooth of the tooth segment 40". During the return movement the disengaging pawl 52 can yield under the action of its spring 50'.

In order that the disc 40 after having made a reverse step cannot be fed forward immediately again by the swinging pawl 41", there is supported upon the shaft 39 a blind cam 47, which is pressed with its arm 47' by a spring 47" against the stop 39", and assumes in Figure 4 the position of rest. During the forward feeding of the disc 40 the pawl 41" pushes forward the blind cam 47, against the tension of the spring 47". In the return movement the pawl 41" slides onto the periphery of the disc 40, the blind cam 47 returning also into its position of rest. Therefore in the next forward movement the pawl 41" rides over the periphery of the blind cam 47 and cannot engage in the tooth gap 40'. This engagement may only occur again after the return of the disc 40 into its position of rest, that is, when all the sequence cards are passed.

If a card presented has a "full"-hole punched out, as is mentioned before, then the reading finger 53 comes into action. This finger passing through the said hole, its bell-crank lever 35 can follow it. This bell-crank lever 35 is connected by a link 53' with the double lever 54, which is supported at 54' and carries on its free arm the pin 54", which engages underneath the slider 49³. In consequence of the movement of the lever 35 the lower arm 54 with the pin 54", is swung towards the left, and raises the slider 49³ so far that with its recess 49" it comes out of reach of the pin 51' of the slider 51. Consequently no feeding of the disengaging pawl 52 takes place, and also no action upon the pawls 42, 43 of the disc 40, and no reverting step of the disc 40 for the card carrying the "full"-perforation. On the other hand a feeding of the cam disc blocks i is prevented because then, by the arm 55⁴ (Fig. 6), mounted fast upon the bolt 54', like the arm 54 (Fig. 4), the contacts 55³ and 56³, shown in Figures 5, 6 and 9, are closed, as a result of which the magnet 57 likewise receives current and presses the bolt 58 in front of the arm e". The result is thereby obtained that the cam disc blocks i maintain the same characterizing number for a further card added to or to be added over the number of sequence cards originally provided for.

Since the presentation of the cards upon the table a' must be effected in continuous sequence and in a regular manner, the driving of the cards, in so far as the presentation is to be mechanically effected, must also be brought into agreement therewith. This is effected by the device illustrated in Figures 10 to 13. The belt-conveyors w running over the table a' receive a uniform drive. At both ends of the belt-conveyors the stacking tables 59 and 59' are guided vertically on rods 59" and suspended on an endless chain 60, which runs over the chain pulleys 60'.

The left hand upper chain wheels 60' are mounted fast upon their shaft 61. Upon this shaft is likewise mounted fast a ratchet wheel 61' (Fig. 12). Loose upon the shaft 61 is mounted a toothed wheel 62 (Fig. 13), which meshes with a toothed wheel 62' on a shaft 62". The shaft 62" receives a continuous drive and carries a cam disc 63 (Fig. 12) which acts upon an arm 63', which swings loosely about the shaft 61, and carries a second arm with a pin 63". There is further loosely rotatable about the shaft 61 an arm 64, which is located within reach of the pin 63" and carries a pawl 64' which meshes with the ratchet wheel 61'. The arm 64 is connected by a link 64" with a bell-crank lever 65 supported at 65', to the other arm of which is attached a feeler support 66, with a feeler roller 66', which is supported upon a feeler shaft 66". It lies above the stack on the table 59 and follows the diminishing of the latter. Following the diminution of the stack, the roller 66' sinks, and thereby pulls the arm 64 after it, with the pawl 64', through the medium of the link 64", until the arm 64 passes within reach of the constantly reciprocating pin 63", and is now pushed forward with its pawl so far that it becomes free from the pin 63" again. The ratchet wheel 61' is thereby stepped in clockwise direction, and in addition, through the medium of the shaft 61, the chain wheel 60' is fed forward, as a result of which the table 59 is raised, while the table 59' sinks to the same extent. The removal of the cards from the stack on the table 59 is effected in a known manner by a suction device 67, which is supported by its arms 67' and 67" on the frame a, and receives its drive from a cam disc mounted upon the shaft 61 through a link 68" and an arm 68 supported at 68'. Along with the sucker 67 conveyor rollers 69 are lowered, the arms 69" of which are supported at 69' and attached by a link 70" to an arm 70 supported at 70', which likewise receives from a cam disc on the shaft 61 an oscillating movement. The card is laid by the sucker 67 upon a pair of continuously revolving conveyor rollers 71, and by means of the rollers 69 and 71 is guided to the bands w.

The driving of the sucker 67 and the conveyor rollers 69 must however only be effected when a correct card was presented. This is effected by aid of the contacts n, n' (Fig 1). These contacts n, n' close, as is described above, the circuit of the electromagnet 102 (Fig. 1a), which by attraction of its armature, acts upon a link 72″, shown in Figure 13. This link is attached to an arm 72, which is suported at 72′, and which bears against a pin 73. Owing to the current impulse occasioned upon closure of the contacts n and n′ the magnet 102 attracts the link 72″ towards the left, and swings the arm 72 in an anti-clockwise direction. In the position shown in full lines in Figure 13, the arm 72 comes within reach of the arm 74″ of a pawl 74 supported loose at 74′ on the continuously rotating toothed wheel 62. This pawl slides upon a disc 75, which has a recess 75′. The disc 75 is mounted fast upon the shaft 61. If the closure of the contacts n, n′ causes a deflection of the arm 72 into the position shown in dotted lines in Figure 13, the pawl 74 remains uninfluenced by the arm 72, engages in the recess 75′, and thereby takes the shaft 61 with it. But as soon as the flow of current through the magnet 102 is interrupted at the contacts n, n′, the arm 72 swings back within reach of the arm 74″ of the pawl 74 and thereby lifts it out of the recess 75′, so that it runs idly around the disc 75. If a wrong card is presented, no new contact closure takes place at n, n′, and the arm 72 remains stationary in its last named position and disengages again and again the pawl 74, so that the shaft 61 is advanced. Consequently the driving of the sucker and of the conveyor rollers 69 is ceased. The same effect is raised when in selecting a predetermined card the contacts 79, 79′ (Fig. 1) are separated from another and switch off the one-revolution coupling magnet 100 as well as the magnet 102, as is described above.

After the reading of the card has been effected upon the band w it passes within reach of a rake 76 (Fig. 10), which with its sector 76″, swings about the shaft 76′, and by means of a sector 77 set in oscillation from the shaft c of the machine, is swung round through 180° at the requisite times. The cards therefore are delivered in correct position to each other onto the stack on the table 59′.

The adjustment of the locking bar 26 (Fig. 1) may take place in a complete mechanical manner, for instance by means of a perforated band containing the distinguishing numbers in field groups of tens, or else by means of individual item cards containing such perforations. A broken piece of such a perforated band is shown in Figure 16. This perforated band 83 has five groups 83′ of ten perforation places each, the groups being arranged in a line, and furthermore has in each line a special hole 83″. The perforations are shown by dark points and designate the numbers placed beside on the right hand margin of the band-figure.

In the selected example according to Figures 18 and 19 this band 83 is clamped in a frame 84 and runs off a roller 84′ in the direction of the arrow onto the other roller 84′ over a saddle 94″, which is perforated correspondingly to the perforation groups 83′ of the band 83, or has a continuous groove. This frame 84 is oscillatably mounted at 84″. Upon the same shaft is mounted a lever 85, which bears with its roller 85′ upon a cam disc 86, which is mounted upon a shaft 86′ uniformly operated from the machine, so that the frame 84 is swung with a uniform oscillating motion against a set of reading fingers 92. This set contains as many individual fingers as the perforation groups 83′ contain fields in total.

The reading fingers 92 are each mounted in a lever 92′. All these levers are mounted loose upon the shaft 88, and they each carry two co-acting arms 92″. These co-acting arms are in staggered relationship to one another, one set straight and the other at an angle. To each the uppermosts of these co-acting arms 92″ belongs a contact 93. These contacts are each connected with magnet coils 82, (Figs. 14–17), to which tnere pertain armature arms 81′, which are supported at 81″ in the machine frame a′. On account of the space being crowded, the magnets 82 are arranged in two rows on each side of the supporting shaft 81″. The armature arms 81′ are correspondingly arranged. Each armature arm has a co-acting arm 81, which is connected by a link 80′ with a co-acting arm 80 of the arms 25″, which are known from Figure 1.

When a characterizing number in the perforation groups 83′ of the band 83 passes over the saddle 94″, and the frame 84, during the revolution of the cam disc 86, swings in the direction to the set of reading fingers 92, then all the reading fingers 92 that do not find a hole in the perforation groups 83′ are raised and close their contacts at 93, whereas the reading fingers 92 that find a hole can pass through the said hole into the saddle 94″ and the contacts at 93 open. Correspondingly also only the appertaining magnets 82 are excited and attract their armature arms 81′ so that by way of the arms 81, the links 80′, the co-acting arm 80 and the lever 25″, the corresponding locking bars 26 are pulled forward, and thus lock the contact lever 27 with the card-selecting effect described with Fig. 1.

In order to advance the perforated band in uniformity with the line spacing of the perforation groups 83′ in the row of reading fingers 92′ a contact lever 94 (Fig. 19) is supported at 94′ on the frame 84, which in the latter has a co-acting contact 94³, which is closed when the lever 94 meets a hole 83″ of the band 83. This contact closes the circuit of a magnet 95, the armature 95′, of which is supported at 95″ on the frame 84, and carries on a co-acting arm 96 a brake shoe 96′, which, when the armature arm 95′ is attracted, is pressed against a roller 84′ bearing thereon. The figure shows the contact 94³ open, because the frame 84 is in its lowermost position, where the brake shoe 96′ is not to be pressed against the roller 84′. In the ratchet wheel 91 there engages a pawl 90′, which is pivoted to a three-armed lever 90, which swings loose about a shaft 89″ of the roller 84, and in one of its arms contains a central arcuate slot 89′. In the latter is guided a pin 89 on a bar 88″, which is pivoted to a bell-crank lever 88′ swinging loose about the shaft 88, the other arm of this bell-crank lever being connected by a link 87′ with the co-acting arm 87 of the arm 85. Accordingly, when the cam disc 86 is revolving, the bar 88″ with its pin 89, is drawn upward whilst the frame 84 is swung down. Thereby a spring 90″ attached to another arm of the lever 90, pulls the lever 90 after it, and therefore the pawl 90′, through an angle of deflection. This angle is defined by that the contact lever 94 meets the following hole 83″, and therefore recloses the contact 94³ for the magnet 95, so that the brake 96′ is immediately attracted, and locks the feeding of the band 83. In the following upward movement of the frame 84 the lowered pin 89 reaches the end of the arcuate slot 89′ and now swings the three-armed lever 89 in a clockwise direction, and thus pulls back the pawl 90′ through a distance corresponding to the aforesaid angle of deflection. The pawl 90' trains with it the ratchet wheel 91 and thereby feeds forward the band 83 with a definite step registering with the distance of perforation groups 83'. By this movement the lever 94 looses the hole 83" and opens the contact 94³. The magnet 95 is therefore de-energized and releases the brake 96' so that in the following downward movement of the frame the pawl 90' may again be deflected as aforesaid.

What we claim is:

1. A machine for reading perforated item-accumulating cards according to a distinguishing number, comprising reading fingers disposed for being simultaneously entered each into a perforation of a card, driving members for each one of the said fingers, adjusting means for each one of the said driving members for actuating the same in groups according to a number of a card, and drive-controlling means disposed for being commonly influenced by all of the said fingers.

2. A machine for reading perforated item-accumulating cards according to a distinguishing number, comprising reading fingers disposed for being simultaneously entered each into a perforation of a card, driving members for each one of the said fingers, adjusting means for each one of the said driving members for actuating the same in groups according to a number of a card, electrical contacts disposed for being commonly influenced by all of the said fingers, and electrical means controlled by the said contacts for stopping the said driving members.

3. A machine for reading perforated item-accumulating cards according to a distinguishing number, comprising reading fingers disposed for being simultaneously entered each into a perforation of a card, driving members for each one of the said fingers, adjusting means for each one of the said driving members for actuating the same in groups according to a number of a card, means for automatically varying the adjustment of said adjusting means according to a predetermined sequence of card-numbers, and drive-controlling means disposed for being commonly influenced by all of the said fingers.

4. A machine for reading perforated item-accumulating cards according to a distinguishing number, comprising reading fingers disposed for being simultaneously entered each into a perforation of a card, driving members for each one of the said fingers, adjusting means for each one of the said driving members for actuating the same in groups according to a number of a card, special drive controlling means for cooperating with the fingers and means for varying the disposition of a predetermined group of the said fingers so as to cooperate the latter with said special drive-controlling means.

5. A machine for reading perforated item-accumulating cards according to a distinguishing number, comprising reading fingers disposed for being simultaneously entered each into a perforation of a card, driving members for each one of the said fingers, adjusting means for each one of the said driving members for actuating the same in groups according to a number of a card, special drive controlling means for cooperating with the fingers and means for varying the disposition of a predetermined group of the said fingers so as to cooperate the latter with said special drive-controlling means, said special drive controlling means including a bar common to all the fingers of said group and electrical contacts disposed on the bar.

6. A machine for reading perforated item-accumulating cards according to a distinguishing number, comprising reading fingers disposed for being simultaneously entered each into a perforation of a card, driving members for each one of the said fingers, adjusting means for each one of the said driving members for actuating the same in groups according to a number of a card, a drive controlling means for cooperating with the fingers, and a lever-system adapted to couple a predetermined group of the said fingers with the drive-controlling means.

7. A machine for reading perforated item-accumulating cards according to a distinguishing number, comprising blocks of cam discs corresponding to the digits of the said distinguishing number, each block consisting of a plurality of cam discs angularly displaced relatively to one another to correspond to the numbers 1 to 9, driving means for advancing the blocks of cam discs, actuating levers associated with the various cam discs, reading fingers belonging to the various actuating levers, means for supplying cards to the reading fingers, each cam disc being adapted to swing an associated actuating lever into the region of its reading finger, and a feed bar common to all the levers.

8. A machine for reading perforated item-accumulating cards according to a distinguishing number, comprising blocks of cam discs corresponding to the digits of the said distinguishing number, each block consisting of a plurality of cam discs angularly displaced relatively to one another to correspond to the numbers 1 to 9, driving means for advancing the blocks of cam discs, actuating levers associated with the various cam discs, reading fingers belonging to the various actuating levers, means for supplying cards to the reading fingers, each cam disc being adapted to swing an associated actuating lever into the region of its reading finger, a feed bar common to all the levers, a plurality of pawls of different lengths corresponding in number to the maximum number of sequence cards in a set having the same distinguishing number, a ratchet wheel adapted to be fed forward by the said pawls to an extent corresponding to the number of sequence cards in a set when the first card of the set is read, an electric circuit, a pair of contacts in the circuit, yielding pressure means adapted to close the contacts when the first of a set of sequence cards is read, and means in the circuit adapted to interrupt the driving of the cam disc blocks when the contacts are closed until the last sequence card of a set has passed the reading fingers.

RICHARD SENKEL.
EMIL DUEBALL.